No. 40,840. PATENTED DEC. 8, 1863.
J. HUTCHISON.
GRAIN CLEANER.
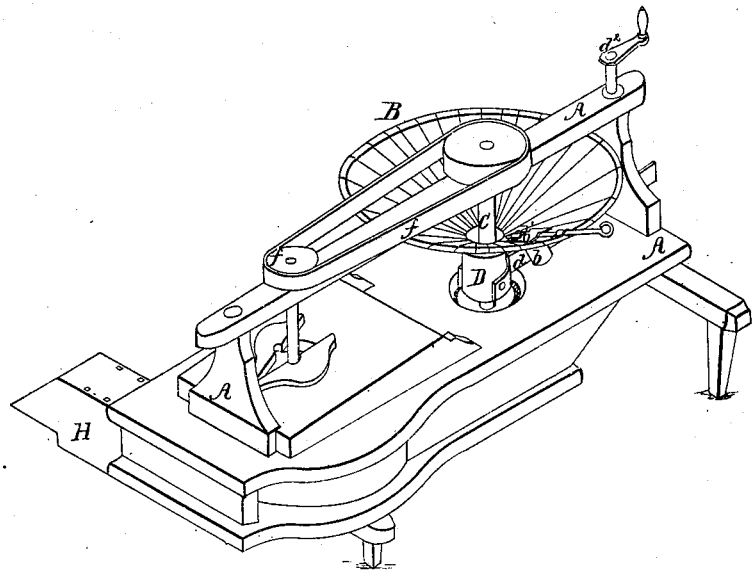
Longitudinal Section
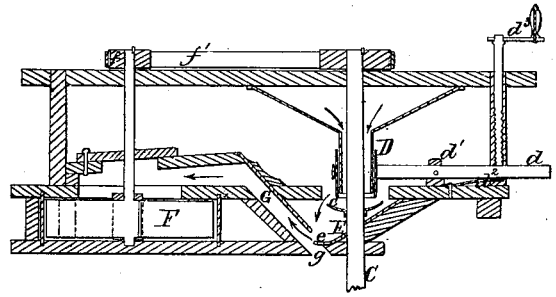
Witnesses:
Inventor;
John Hutchison
Per Wm. D. Baldwin, Atty

UNITED STATES PATENT OFFICE.

JOHN HUTCHISON, OF THREE RIVERS, MICHIGAN.

IMPROVEMENT IN GRAIN-CLEANERS.

Specification forming part of Letters Patent No. 40,840, dated December 3, 1863.

*To all whom it may concern:*

Be it known that I, JOHN HUTCHISON, of Three Rivers, in the county of St. Joseph and State of Michigan, have invented certain new and useful Improvements in Machinery for Cleaning Wheat and other Grain, of which the following is a full, clear, and exact description, reference being had to the accompanying drawings, which make part of this specification, and in which—

Figure 1 represents a view in perspective of a machine for cleaning grain to which my improvements are applied, and Fig. 2 a vertical longitudinal central section through the same.

My invention relates to that class of grain-cleaners which is used in combination with a millstone, for the purpose of cleaning and grinding the grain at one operation; and my improvements consist, first, in combining a rotating cup or scattering-dish on the spindle or shaft of the millstone with the hopper from which the grain is fed to the stone, by means of a sliding sleeve or cut-off, for the purpose of regulating the feed, as hereinafter described; secondly, in combining the scattering-dish with an inclined board having an upwardly-curved shoe or beak at its point, projecting into the blast-spout, so that the momentum acquired by the grain in its descent may serve to throw it up the suction-spout and thus cause it to be more thoroughly winnowed, as hereinafter shown; thirdly, in combining a sliding-sleeve cut-off, a scattering-dish, a cant-board, and a suction-spout with a fan, for the purpose of cleaning the grain, as hereinafter described; fourthly, in combining a toll dish or box with the hopper by means of a slide or valve so that the proper amount of toll may be subtracted by simply working the slide, as hereinafter described.

In the accompanying drawings, the mechanism is shown as supported by a stout frame, A, and inclosed in a suitable casing. The hopper B has a toll-dish of the proper capacity to toll a single bushel of grain, or box $b$, inserted into it. This dish is closed at the bottom and has a slide-valve, $b'$, working over its top, so that by opening the valve the toll may be subtracted. When this is done, the valve is closed and any further escape of the grain prevented. This device, it will be seen, obviates the necessity of handling the grain to take the toll. The spindle or shaft C, which carries the millstones, revolves within the hopper. A dish or cup, $c$, is mounted upon this shaft below the mouth of the hopper, so that the grain may fall into it and be scattered by the centrifugal force generated by its rotation.

In order to regulate the flow of grain from the hopper, I encircle its mouth with a sliding sleeve, D, attached to a lever, $d$, rocking on a pivot or fulcrum, $d'$, on the frame. A spring, $d^2$, on the under side of this lever, tends to keep it thrown up all the time, in which position the sliding sleeve D would rest upon the cup and stop the flow of grain from the hopper. A set-screw, $d^3$, controls the movement of this lever and to hold it in any required position, thus regulating the feed. As the grain is discharged from the cup it falls upon an inclined board, E, having a curved beak or edge, $e$, at its lower end. The fan F is driven by a belt, $f$, and pulley $f'$ from the shaft C. The air is drawn into the fan through an inclined suction-spout, G, into which the inclined board E projects. This spout is made of gradually-diminishing area from its lower to its upper end, in order to increase the velocity and density of the blast. As the grain rushes down the inclined board E, it is deflected upward by the curved end or beak $e$, and thrown into the blast-spout, where it is thoroughly winnowed. The sound grain passes out at the opening $g$ into the eye of the millstone, while the chaff is sucked out through the waste-spout H.

What I claim as my invention, and desire to secure by Letters Patent, is—

1. The combination of the hopper, the sliding sleeve, and the rotating dish or scattering-cup, substantially in the manner and for the purpose described.

2. The combination of the scattering-dish, inclined board E, and beak $e$ with the suction-spout, as described, for the purpose set forth.

3. The combination of a sliding sleeve, cut-off, a cant-board, and a suction-spout with a fan, substantially in the manner described, for the purpose set forth.

4. The combination of the hopper, the toll-dish, and the slide-valve, as and for the purpose set forth.

In testimony whereof I have hereunto subscribed my name.

JNO. HUTCHISON.

Witnesses:
 S. CHADWICK,
 CYRUS ROBERTS.